Figure 1:
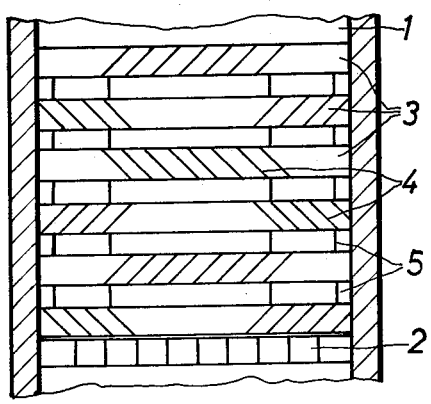

July 30, 1963 W. KRÖNIG ETAL 3,099,538

FITTINGS FOR A FLUIDIZED BED REACTOR

Filed Jan. 20, 1959

INVENTORS:
WALTER KRÖNIG, WALTER BAYER, HANS-JOACHIM WAHL, LUDWIG BACHER.
BY
ATTORNEYS

United States Patent Office 3,099,538
Patented July 30, 1963

3,099,538
FITTINGS FOR A FLUIDIZED BED REACTOR
Walter Krönig, Leverkusen-Bayerwerk, Walter Bayer and Hans-Joachim Wahl, Dormagen, and Ludwig Bacher, Opladen, Germany, assignors to Farbenfabriken Bayer Aktiengesellschaft, Leverkusen, Germany, a corporation of Germany
Filed Jan. 20, 1959, Ser. No. 787,843
Claims priority, application Germany Jan. 24, 1958
8 Claims. (Cl. 23—288)

The invention relates to a means for improving the operation of a fluidized bed consisting of finely divided solid substances.

It is known that fluidized layers which are whirled by gases at very high flow velocity and which contain comparatively coarse-grain material as the solid body being whirled or fluidized, readily show a lack of homogeneity, by for example the formation of large bubbles, gas occlusions and fountains of solid substance; by this means, the gases are brought into non-uniform contact with the solid substance and thereby the catalytic reaction is deleteriously affected. This is particularly disadvantageous when working with short residence times, such as is the case for example with the pyrolytic cracking of hydrocarbons.

Consequently, several proposals have been made for improving the operation of a fluidized bed by mechanical obstructions, so-called baffle plates, being arranged therein. By this means, large bubbles are broken down or split up and the violent motions of the bed are retarded.

For example, baffle plates for a small experimental apparatus have been described, these plates being fixed on a rotating shaft. Experience has shown however, that it is very difficult, particularly at high temperatures, to operate such mechanically moving parts in the presence of finely divided solids (cf. Beck: Ind. Eng. Chem. 41 (1949), II, pages 1242/3). Furthermore, stationary baffle plates have also been described in this publication which are fixed on a central shaft, but these are unsuitable for large-scale operations, because a simple geometrical enlargement has a different effect from that desired due to the larger rebound surfaces. In both cases, irregularities in the flow conditions are produced in large reaction vessels.

It has also already been proposed to use solid heaps of filler bodies as baffle elements, these heaps being of such a size and so shaped and arranged, as to produce a labyrinth of discontinuous and sinuous gas paths (cf. U.S. patent specification No. 2,557,680). However, these filler bodies have considerable disadvantages. At relatively high flow velocities of the fluidizing gas, they are rubbed against one another and thereby eroded or destroyed; consequently, they must always have a high bulk density so that they are not removed from their static position by the flow of motion. When these filler bodies consist of ceramic materials, they have a high natural volume and therefore have an especially disadvantageous influence on the size of the reaction chamber. Furthermore, it is never possible to avoid them offering locally horizontal or substantially horizontal surfaces, on which the fine-grained solid body is deposited, that is to say, it is removed from the fluidized bed and may adhere to the said surface.

Fixed geometrical arrangements which serve as distributing surfaces for fluidized bed arrangements and which are traversed in stages have also been described. The object of these arrangements is to homogenize the horizontal flow of the fine-grain solid through one stage (see German patent specification No. 937,768). However, as they all have the same direction, they are not suitable for use in single tall fluidized beds. They are only intended for relatively low fluidized beds. If a tall heap of a whirling solid is provided with baffle plates which are parallel over the entire height, large channels which extend over several layers of baffle plates are formed, and give inclined flows which make the fluidized bed even less homogeneous than it would be without baffle plates. Baffle plates arranged in this way also lead to considerable wear in the upper layers.

Attempts have also been made to use as distributing elements ballast members, which have a relatively small ratio between the actual volume and the intermediate body volume but nevertheless offer a relatively large surface on which the solid bodies can only be deposited to a small extent, and which on the other hand offer a great resistance to the whirling solid bodies, that is to say wire spirals, hedgehog-like wire structures, baffle rings, etc (see British patent specification No. 676,613). However, these bodies have the disadvantages that they either have only a low strength factor or become hooked within one another. This causes more lack of homogeneity in the charging and whirling actions with a disadvantageous effect, particularly in connection with high-temperature cracking of hydrocarbons.

It has now been found that the disadvantages arising with the known arrangements can be counteracted by introducing into the fluidized bed, or into a substantial part thereof, fittings which consist of inclined parallel baffle surfaces, arranged one above the other in several layers, and adjacent to one another with a certain spacing, the direction of inclination of said surfaces changing in the superimposed layers.

Figure 2:
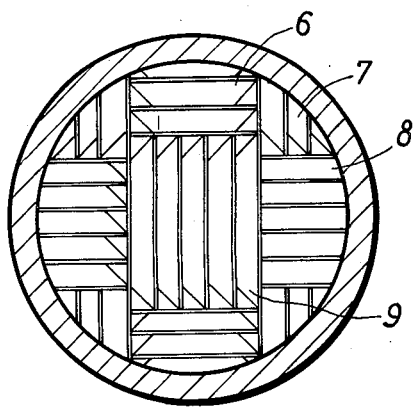

The principle of the fittings used according to the invention will be seen from FIGURES 1 and 2 of the accompanying drawings. FIGURE 1 shows a longitudinal section through a reactor 1, inside which is located the fluidized bed of fine granular heat carriers, the said bed not being illustrated. Arranged on the grate 2 are six layers 3 of baffle surfaces 4. These layers of baffle surfaces are interconnected by stays 5. FIGURE 2 is a plan view of one layer of baffle surfaces, in which the baffle surfaces are assembled in four groups 6 to 9.

Figure 3:
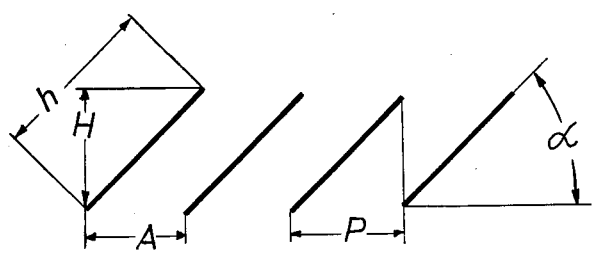

It is an important feature of the invention that the slope angle α of the baffle plates relative to the horizontal (see FIGURE 3, which is a side elevation of part of one layer of baffle surfaces) is to be so adjusted that on the one hand the fine-grained solid bodies cannot be deposited thereon, but can slide completely down thereon, and that on the other hand the whirled and thus upwardly moving solid particles are sufficiently retarded in their upward movement, whereby the density of the fluidized bed is increased and the contact with the gases is improved. At the same time, however, the exchange reaction of the solid body, for example the heat exchange, which is characteristic of a fluidized bed, is not essentially impaired, as was usually the case with the obstructions formerly employed.

It has been found that the baffle surfaces, for example those used in connection with pyrolysis reactions with inert heat carriers and having a size of about 1 mm., must generally have an angle slope of α of 40–65°, advantageously in the region of 50° relative to the horizontal plane, in order to satisfy the flow conditions described in the previous paragraph. The most favourable conditions however can easily be determined by preliminary experiments in the individual cases.

Usually, the spacing apart of the parallel baffle plates depends on the size of this angle. If the inclined baffle surfaces are comparatively steep, then the horizontal spacings A (see FIGURE 3) between them must be small; if the baffle surfaces have a shallow slope, the spacings can be larger. The spacings A between the parallel baffle plates therefore bear quite a specific ratio to the dimensions and to the angle of a baffle surface in order to produce good results. It has been found that when the distance A between the parallel baffle plates is too large, unretarded solid bodies flow therethrough, and that when the baffle surfaces are adjacently disposed too close to one another ("overlapping"), the heat or material exchange vertically and horizontally is unsatisfactory. It has proved particularly desirable to arrange the plates at such a distance from one another that their horizontal projections P just adjoin one another, for which purpose, as regards the horizontal spacing A, overlapping or widening of the spacings by ±20% is permissible. Thus, A can range from 80% to 120% of P.

If reaction chambers with a large cross-section are used, it is advisable to subdivide the layers of baffle surfaces, for example into four quadrants each comprising parallel baffle surfaces, and so that the edge direction of the baffle surfaces of different groups of each layer is different.

The baffle surfaces can also be arranged in circular formation around one another within separate layers instead of in separate groups.

Furthermore, it is a characteristic feature of the process of the invention that the direction of inclination of the separate layers of the superimposed baffle surfaces or groups of baffle surfaces is not constant, the direction of the edges of the parallel baffle surfaces in the superimposed layers advantageously changing in each case by 90° or a multiple of substantially 90°. Preferred arrangements are 0°/360°–90°–180°–270°–0°/360° ... or 0°/360°–180°–90°–270°–0°/360°. Consequently the arrangement of each fifth layer is the same as the first. With this arrangement sufficient resistance in each layer is opposed to the solid body impinging from below, so that the said body is deflected and retarded.

The fittings arranged according to the invention convert the movement of the gases and vapours into small individual streams and prevent the formation of relatively large bubbles. Furthermore, the surfaces arranged in accordance with the invention also have the effect that each individual stream is always broken down again, so that increased velocities of the solid cannot occur at any position in the fluidized bed. For this reason, it is also advisable to fill the entire cross-section of the reactor with baffle plates, so that a single stream cannot pass through at any point, as the increased flow velocities of the solid bodies occurring at these points would cause a strengthened impingement of the solids on the surfaces, and thus considerable wear thereon.

In order to produce a best possible retarding action, it is necessary to limit the height H of a layer of the impingement surfaces in a specific manner. The grain, moving upwards at an inclination between two plates, experiences an acceleration during this travel before this acceleration has reached a critical maximum value, the grain must have already left the layer concerned and reached the next layer, on the impingement surfaces of which it is then deflected into a new direction and is therefore retarded. If the critical speed within one layer is exceeded, then the grain is whirled up too strongly in the space between two layers, and causes wear on the next following layer of baffle surfaces. For whirling solids with a grain size of 0.2 to 2 mm. in diameter at a speed of 1.0 to 3.0 m./second, based on that in space free from solid bodies, surface widths $h$ of approximately 40 to 110 mm., advantageously 70–80 mm., are suitable, in which case the layer height H (see FIGURE 3), is about 30–90 mm., advantageously about 60 mm.

Between the separate layers of baffle surfaces it is necessary to provide an intermediate space which permits the whirling solid body to experience unimpeded heat or substance exchange in all horizontal directions. This intermediate zone on the other hand must be kept sufficiently small for the retarding action not to be completely cancelled out again. With low linear gas velocities, the intermediate zone can be of comparatively large height, but it must be comparatively small with high gas velocities. The spacing between two baffle surfaces is preferably so chosen that it lies between one tenth of the height H of the layers and the same as this height. It is advantageous to select spacings of from 0.3 to 0.5 H.

The spacings of the layers of baffle surfaces can also be varied within the same fluidized bed. It may be advantageous to maintain large spacings in the lower part of the bed and small spacings in the upper part of the bed, this being especially the case when there is for example an increase in the gas volume within the fluidized layer due to the progress of the reaction. Alternatively, it may be desirable to maintain a different solid density in different regions of the fluidized bed. Simultaneously with these spacings, it is advisable to modify the retarding capacity of a layer of baffle plates (spacing, height, and inclination of the baffle plates).

It is advantageous to permit the baffle surfaces also to project above the upper limit of the fluidized layer, so that even with fluctuations in level, sufficient safeguard against eruptions of the fluidized bed is still maintained.

As material for the fittings, it is possible to use metals, metal alloys or ceramic masses, which are equal to the chemical and mechanical stresses, even at high temperatures. It may also be advisable to use materials which are catalytically active. It is essential to make at least the top of the surfaces as smooth as possible. Advantageously, the surfaces of the baffle plates are also specially protected against erosion, for example by applying a protective layer consisting of a particularly resistant material. The wall thicknesses of the fittings are to be kept as small as possible, since it is essential in the operation of a fluidized bed, and for maintaining a favourable yield per unit of volume and time, that the space occupied by the baffle plates is kept as small as possible. This object is achieved in a particularly satisfactory manner by the fittings used according to the invention. The volume occupied by the fittings is generally only 2–10% but never more than 20% of the unoccupied volume of the reaction chamber in which they are located.

The fittings can be secured in any manner known per se. For example, the layers can be assembled altogether or in groups to form a set and be connected by a system of rods or bars, for example by welding them to a plurality of vertical holding rods, whereby the complete set is already given an adequate support because of its weight. The holding devices can however also be connected fast to the wall or bottom of the reaction vessel. Due to the simple method of securing the layers of baffle surfaces to the rod or bar system, it is possible to alter quickly the spaces of the layers. The fixing should be such that the fittings cannot vibrate, even at high gas velocities, and cannot rub against one another. Horizontal surfaces should be avoided as far as possible with the supporting arrangement in order to avoid deposition of fine-grain solids.

If the reactants are introduced into the reaction vessel from below, it is frequently advisable for the layers of fittings to start only after a certain pre-mixing zone, that is to say at a certain distance above the point of introduction of the reactants so that it is always ensured that the reactants have been well distributed throughout the entire cross-section of the container before entering the layer of baffle plates and that then the layer of fittings is contacted as uniformly as possible. This arrangement furthermore prevents a stream of reaction compounds etc. issuing from the supply device, while it is still directed at an acute angle causing erosion on the lowermost layer of baffle plates.

In many cases, it is very desirable, especially with high temperature reactions, that the reaction products should be cooled quickly after leaving the fluidized layer, this being effected for example by the injection of water.

According to the prior processes, this working method was usually impaired by the fact that solid materials carried upwards from the fluidized bed were also partially cooled by the coolant. Alternatively, the cooling of the reaction products could only be carried out at a later stage, whereby certain undesirable secondary reactions had to be expected and accepted.

By using the fittings employed for the invention, it is readily possible for the coolants to be already injected in the reaction vessel and in fact immediately above the fluidized layer.

The process of the invention is suitable for working with dense fluidized layers of finely divided solids and upwardly flowing gases at comparatively high gas flow velocities, more especially for processes carried out at high temperatures, for example oil cracking processes. It can however also be employed with any other type of fluidized bed process, and also for those at low temperatures, for example chemical reactions between gases and solids or between gases in the presence of solids, drying processes, gas-extraction processes and gasification processes, etc.

*Example 1*

A fluidized layer of an inorganic heat carrier with a grain size of from 0.2 to 1.0 mm. was maintained at 800° C. in a cylindrical reaction vessel having a diameter of 0.5 m. The heat carriers flow through the reaction vessel in a continuous stream, entering laterally at the upper end of the fluidized layer and escaping at the bottom end thereof. Acting as fluidizing gas are the vapours and cracking gases of 150 kg./h. of benzine and 150 kg./h. of steam. The velocity of the vapours, related to the empty reactor, is 1.8 m./sec. at the outlet from the fluidized layer. Arranged in the reaction vessel above the supply device for the reactants are 15 layers of baffle plates consisting of heat-resistant alloyed steel. Each layer has parallel baffle plates which have a height H of 40 mm., a horizontal spacing from one another of 30 mm. and a slope angle of 50°. The distance between each layer is 15 mm., and the horizontal direction of the edges of the baffle plates changes from layer to layer by 90°.

By means of these obstacles, it has been possible to maintain continuous uninterrupted operation for a period of a month. The density of the fluidized bed remained unchanged at 1.0 kg./l. In spite of the high gas velocity in the fluidized bed, pulsatory operation did not occur and there was no formation of relatively large bubbles, since the inclined surfaces subdivided, broke up the flow and deflected it into a different direction. Nevertheless, practically uniform temperatures are obtained at all points of the fluidized bed.

*Example 2*

In the dehydrogenation of butylene to butadiene in the fluidized bed, the hydrocarbon and the granulated catalyst are made to travel in countercurrent through a reactor. The flow velocity of the rising vapours is so controlled that an active fluidized bed is maintained in the reactor. Since the catalyst in this reaction serves not only as heat carrier, but also reacts with the hydrocarbon, it is necessary to have an extremely fine subdivision of the vapours in the fluidized bed in order to produce good results.

Arranged inside the fluidized bed are 15 layers of baffle plates consisting of heat-resistant alloyed steel. Each layer has parallel baffle plates with a height of 60 mm., a horizontal spacing from one another of 40 mm. and a slope angle of 65°. The distance from layer to layer is 60 mm., and the horizontal direction of the baffle plate edges changes from layer to layer by 60°.

Using this arrangement, and by comparison with the working method not using baffle plates, a 20% higher content of butadiene was found in the dehydrogenation gas due to the more uniform distribution of the gases in the fluidized bed.

Correspondingly good results were also obtained in the conversion of benzene to diphenyl and terphenyl.

We claim:

1. A fluidized reactor bed comprising a chamber having an inlet in its lower end and an outlet in its upper end, a plurality of superposed baffle layers in said chamber, each layer having smooth upper surface baffles inclined with respect to the flow course through the chamber, and each baffle layer covering the entire cross section of said chamber to prevent an unobstructed path through said chamber, each layer of baffles being composed of juxtaposed groups of baffles in which the baffles of each group are disposed substantially parallel to each other and are disposed at an angle with respect to the baffles of the juxtaposed groups, the baffles of adjacent layers in direct overlying relationship having different directions of inclination.

2. A fluidized reactor bed as set forth in claim 1, each baffle having a lower deflecting face inclined to the general direction of gas flow through said chamber.

3. A fluidized reactor bed as set forth in claim 1, in which the layers are disposed at spaced intervals.

4. A fluidized reactor bed, as set forth in claim 1, in which said layers are separated from each other at a distance not greater than the height of such layers and not less than 1/10 of said height.

5. A fluidized reactor bed as set forth in claim 3, in which such spacing is greater between the bottom layers.

6. A fluidized reactor bed, as set forth in claim 1, in which the groups of baffles in a layer are perpendicular with respect to each other.

7. A fluidized reactor bed, as set forth in claim 1, in which the horizontal projection of each baffle substantially adjoins such projection of the next adjacent baffle.

8. A fluidized reactor bed, as set forth in claim 1, in which the inclination of the baffles to the axis of the chamber is between 50° and 25°.

References Cited in the file of this patent

UNITED STATES PATENTS

| | | |
|---|---|---|
| 2,581,134 | Odell | Jan. 1, 1952 |
| 2,639,973 | Fritz | May 26, 1953 |
| 2,687,343 | Crask | Aug. 24, 1954 |
| 2,724,686 | Nicholson | Nov. 22, 1955 |
| 2,741,546 | Sweeney | Apr. 10, 1956 |
| 2,866,625 | Sylvest | Dec. 30, 1958 |
| 2,893,849 | Krebs | July 7, 1959 |
| 2,952,617 | Haig | Sept. 13, 1960 |

FOREIGN PATENTS

| | | |
|---|---|---|
| 7,909 | Great Britain | of 1908 |